H. P. UNDERHILL.
Fertilizer-Distributer.

No. 200,490. Patented Feb. 19, 1878.

Witnesses:
Alex Mahon
John G. Center

Inventor:
Henry P. Underhill
by A. M. Smith, atty

UNITED STATES PATENT OFFICE.

HENRY P. UNDERHILL, OF BALTIMORE, MARYLAND.

IMPROVEMENT IN FERTILIZER-DISTRIBUTERS.

Specification forming part of Letters Patent No. 200,490, dated February 19, 1878; application filed January 4, 1878.

*To all whom it may concern:*

Be it known that I, H. P. UNDERHILL, of the city and county of Baltimore, State of Maryland, have invented certain new and useful Improvements in Machines for Distributing Fertilizers, &c., of which the following is a full, clear, and exact description, reference being had to the accompanying drawings, making part of this specification, in which—

Figure 1:
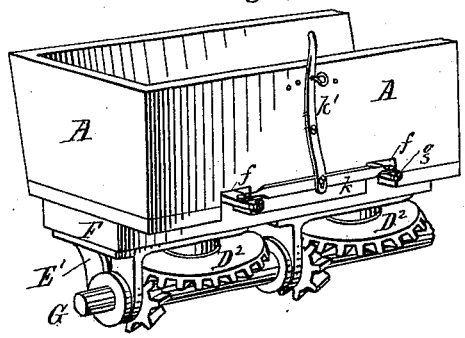
Figure 2:
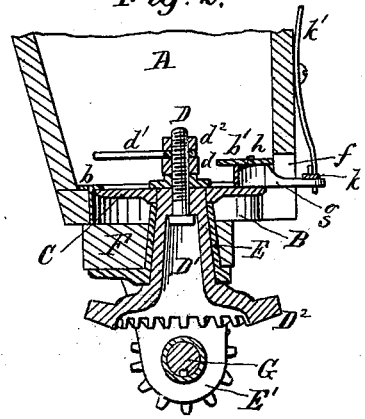
Figure 3:
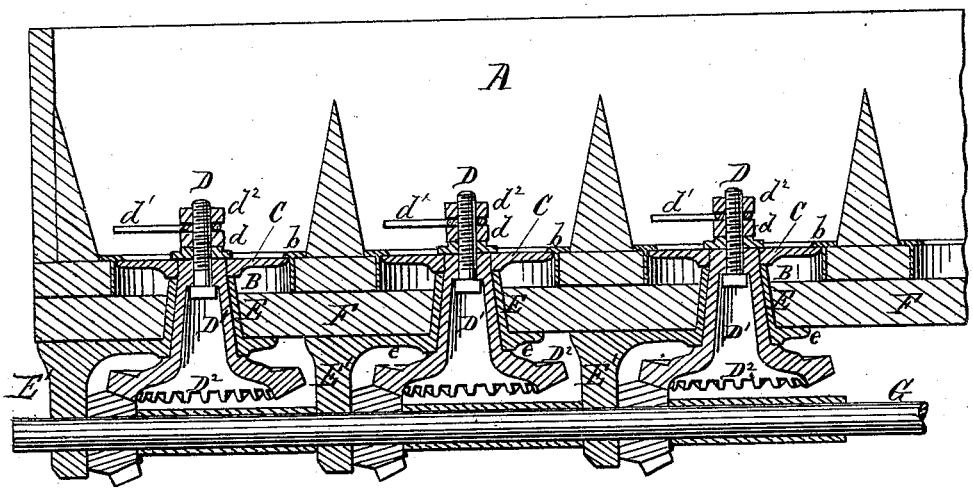
Figure 4:
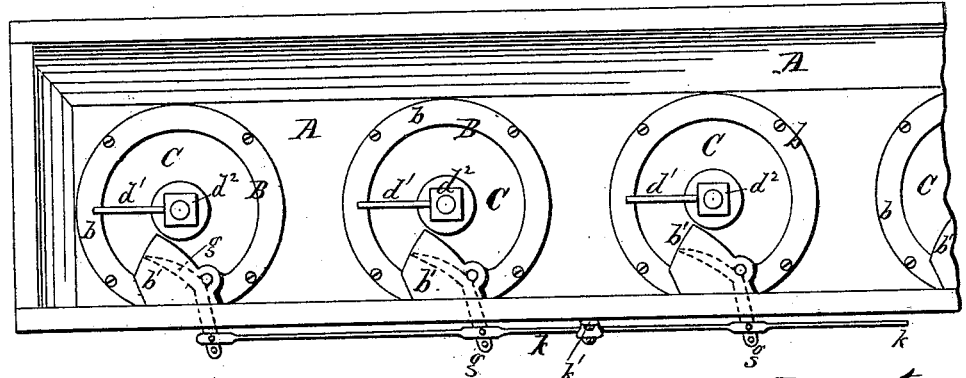

Figure 1 is a perspective view of a portion of the fertilizer-hopper and its attachments. Fig. 2 is a vertical transverse (longitudinal relative to the path of the machine) section through the hopper and its attachments, taken in line with one of the distributer-wheel shafts. Fig. 3 is a longitudinal vertical section through said hopper, &c., and Fig. 4 is a plan view of the same.

Similar letters of reference denote like parts wherever used.

My invention relates to a novel means for sowing or distributing fertilizers, such as guano, bone-dust, and the other materials or compounds used in a pulverized or powdered form for fertilizing purposes. These various materials, as is well known to all familiar with their use, are usually of such a nature that they absorb from the atmosphere and retain a great amount of moisture, which imparts to them an adhesive or sticky property, which renders it exceedingly difficult to effect their discharge or distribution in even or uniform quantities; and frequently the devices which have been employed to agitate and lighten them up, to adapt them to be more easily and evenly discharged, have been found, in practice, to produce a contrary effect, and to pack them more firmly together, rendering it impossible to effect their distribution in the desired manner.

The object of my invention is to overcome this difficulty by the employment of devices adapted to this peculiar property or condition of the material operated upon; and to this end the invention consists in the combination, with a horizontally-rotating disk, or series of disks, arranged in the bottom of the hopper, and on which the fertilizer rests and moves, of an adjustable tongue plate or plates, gages, or scrapers, for separating from the moving mass the quantity which it is desired to discharge, and causing the same to be discharged in a continuous and even stream, as hereinafter described.

The invention further relates to certain details of construction and arrangement of parts for carrying out the above-described improvement.

In the accompanying drawings, A represents a box or hopper, which, in practice, is ordinarily mounted upon a grain-drill or seeding-machine, and placed transversely across the frame by the side of, and either in front or in rear of, the grain-box, frequently forming only a separate compartment of one and the same box therewith; but this, of course, is optional, as it may be thus used, or it may be used as a separate machine, with suitable frame and carrying and driving wheels, as preferred.

Where a long narrow hopper, extending across the machine, as described, is employed, the bottom is cut away in a series of circular openings, of a diameter equal or nearly equal to the width (from front to rear) of hopper, the series extending from end to end thereof, in close proximity with each other, as shown. The openings or large perforations thus formed have flanged rings B fitted snugly within them, the horizontal flanges $b$ at the upper edges of these rings overhanging the portions of the hopper-bottom not cut away, and serving to support the rings in place.

The flanges $b$ also project inward from the rings, overhanging horizontal disks C fitting within the rings and rotating therein, said flanges preventing the escape of any of the fertilizing material between the disks, which are thus made to close the circular openings in the hopper-bottom and the rings or annular casings B to said openings.

The disks C are secured to and rotate with vertical shafts D, which, either directly or through hubs $D^1$ on the crown or bevel driving-wheels $D^2$, attached to their lower ends, are journaled in bearing-thimbles E, secured in a transverse frame-bar, F. (See Figs. 2 and 3.)

The thimbles or bearings E are secured to plate or bar F by means of flanges $e$ and bolts or screws passing through said flanges and bar, or in any other convenient manner.

G is a driving-shaft, mounted in suitable bearing-brackets E', shown, in the present instance, pendent from and formed or cast in one piece with the bearing-thimbles E and their flanges $e$; but they may be made separate therefrom and applied to any convenient support on the frame.

The shaft G has a number of bevel-pinions mounted upon and rotating with it, conforming in number to the number of rotating disks C, for driving the same, and is driven either directly from one or both of the carrying-wheels of the machine or directly through any suitable arrangement of gearing for the purpose, connecting it with said wheel or wheels on their shaft, and may be provided with backing-ratchets, adapting it to operate only in the forward movement of the machine, and also with means for throwing it out of gear, for facilitating the movement of the machine from place to place when not in operation.

In the drawings, the hubs $D^1$ of the wheels $D^2$ are represented as made hollow and extending through the thimble E in the tapering form, with the disks C secured upon their upper ends by means of bolts D and nuts $d$, the disks resting upon the upper ends of thimbles E, as shown; but any suitable arrangement of shafts may be employed connecting the disks with the driving-wheels $D^2$, and other forms of driving-gear may be employed, if preferred.

The hopper has discharge openings or apertures formed in it in the wall of the hopper, just above each disk, at one side, as shown at $f$; and within each of these apertures is a gage plate or lever, $g$, pivoted at $h$ in a cap plate or cover, $b'$, cast upon or connected with the flanges of ring B.

The inner end of the lever overhangs the disk C, in close proximity therewith, and the outer ends of these gage plates or levers are connected with a reciprocating bar, $k$. This bar $k$ has a lever, $k'$, connected with it, pivoted midway of its length, and extending up within convenient reach of the driver, who, by moving the lever, can simultaneously adjust the entire series of gages, as described.

The lever may move over a graduated rack or plate for indicating the adjustment of the gages and the amount of fertilizer sown per acre, if desired, and may be held at any desired point of adjustment by a pin, $l$, or by notches in the rack, or by other suitable device for the purpose. The end of the gage $g$ overhanging the rotating disk C by preference is made tapering, in horizontal section, to an edge, as shown in dotted lines, Fig. 4, in such manner as to adapt it to pare off from the moving body or mass of the fertilizing material just so much as it is desired to feed outward through the discharge-aperture $f$, which amount is determined by the adjustment of the gages $g$.

The disk C is held down upon the hub $D^1$ by a washer and a nut, $d$, and above the nut $d$ the shaft or bolt D has a horizontal arm or stirrer, $d^1$, secured to it, held in place by a nut, $d^2$, said arm rotating with the shaft above the disk C and over the cap-plate $b'$ to the gage $g$, and serving to undermine or cut away the foundation from the superincumbent mass of material in the hopper, and thereby to prevent said material from arching over, and thus failing to be acted upon by the gage-plate.

The operation of the parts will be readily understood. The fertilizer to be distributed is placed in the hopper A, and rests mainly on the disks C, which, when the machine is in operation, are given a rotary movement, carrying the portions of the material resting thereon with them, and a portion thereof, according to the adjustment of the gage-plates, is carried outside of the point of said plate, and is crowded onward and outward through the discharge-outlets $f$, and passes thence to the seed-tubes or other devices for depositing it upon the ground. The radial arms $d^1$ serve to prevent the material from arching over the disks against the stationary sides of the hopper, and thus interfering with the action of the gages.

The hopper has been described as extending across the machine, and provided with a series of rotating disks, as shown in Fig. 4, it being designed to use one such disk with its adjustable gage to each distributer or drill-tooth in a grain-drill; but for uneven or side-hill work it will be found serviceable to divide the hopper into separate compartments, one for each disk, as shown in Fig. 3, or one for every two or three disks, for preventing the fertilizing material from being jolted or thrown by the inclined position of the machine too much to one side or end of the hopper.

In other cases a separate hopper for each disk may be employed, either square or circular in form, and at its lower end conforming in size and form to the disk. This construction will be found useful in such machines as corn-planters, where the rows planted are some distance apart. These modifications, with others, such as the addition of other stirrers, either in the same horizontal plane with stirrer $d^1$ or one above another, attached to the same shaft, will readily suggest themselves to the manufacturer in conforming the invention to the seeding or planting machine to which it is to be applied.

The invention described, while especially designed for and found to be particularly adapted to the distribution of fertilizers, has also been found very effective in sowing grain as applied to grain-drills, and may be used for distributing or planting and sowing grain and other seeds either broadcast or in drills; and I therefore do not wish to be restricted to fertilizers in the use of the improvements described.

I would state that I am aware that horizontally-revolving disks and stirrers have been used in grain-drills, and also that adjustable gages have been employed in connection with vertically-rotating disks for regulating the discharge of grain, and I do not, therefore, claim these parts broadly and irrespective of their arrangement; but

Having now described my invention, what I claim as new, and desire to secure by Letters Patent, is—

1. The horizontally-rotating disk or hopper-bottom, in combination with an adjustable pivoted tongue plate or gage, for effecting and controlling the discharge of the contents of the hopper, substantially as described.

2. The combination, with the hopper, of a series of horizontally-rotating disks or bottom-plates, each provided with an adjustable pivoted tongue plate or gage, for regulating the discharge of the grain or fertilizer, as described.

3. The combination, in a machine for distributing fertilizers, of a series of horizontally-rotating disks, separately-pivoted tongue plates or gages for regulating the discharge of the fertilizer, and means for simultaneously adjusting said gages, substantially as described.

4. The combination of the rotating hopper bottom or disk, the pivoted tongue-plate moving over said disk, and the horizontally-rotating stirrer arranged above said disk and tongue-plate, said parts being combined and operating substantially as described.

HENRY P. UNDERHILL.

Witnesses:
GEORGE W. WARFIELD,
E. GEORGE KEEN.